(12) United States Patent
Warren et al.

(10) Patent No.: US 8,893,155 B2
(45) Date of Patent: Nov. 18, 2014

(54) PROVIDING DISTRIBUTED ARRAY CONTAINERS FOR PROGRAMMING OBJECTS

(71) Applicant: Microsoft Corporation, Redmond, WA (US)

(72) Inventors: Richard A. Warren, Acton, MA (US); Sudarshan Raghunathan, Cambridge, MA (US); Adam P. Jenkins, Marlborough, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/828,981

(22) Filed: Mar. 14, 2013

(65) Prior Publication Data

US 2014/0282614 A1    Sep. 18, 2014

(51) Int. Cl.
*G06F 3/00* (2006.01)
*G06F 17/30* (2006.01)
*G06F 9/46* (2006.01)

(52) U.S. Cl.
CPC ..................................... *G06F 9/465* (2013.01)
USPC .......................................... 719/316; 707/801

(58) Field of Classification Search
CPC . G06F 3/0683; G06F 17/30584; G06F 9/465; H04L 67/10
See application file for complete search history.

(56) References Cited

U.S. PATENT DOCUMENTS

| 5,095,522 | A | 3/1992 | Fujita et al. |
|---|---|---|---|
| 5,999,987 | A | 12/1999 | O'Farrell et al. |
| 7,159,211 | B2 | 1/2007 | Jalan et al. |
| 7,346,901 | B2 | 3/2008 | Syme et al. |
| 7,676,791 | B2 | 3/2010 | Hamby et al. |
| 7,725,679 | B1 | 5/2010 | Anderson et al. |
| 7,743,087 | B1 | 6/2010 | Anderson et al. |
| 7,783,686 | B2 * | 8/2010 | Gates et al. .................. 707/829 |
| 7,853,937 | B2 | 12/2010 | Janczewski |
| 8,046,746 | B2 * | 10/2011 | Tillmann et al. .............. 717/133 |
| 8,156,153 | B2 * | 4/2012 | Wang et al. ................... 707/801 |
| 8,296,743 | B2 | 10/2012 | Linderman et al. |
| 8,458,680 | B2 | 6/2013 | Crutchfield et al. |
| 8,739,137 | B2 | 5/2014 | Siskind et al. |
| 8,745,603 | B2 | 6/2014 | Mcguire et al. |

(Continued)

OTHER PUBLICATIONS

Kovari, et al., "WebSphere and .NET Coexistence", In Redbooks of IBM, Mar. 2004, 612 pages.

(Continued)

*Primary Examiner* — Tuan Dao
(74) *Attorney, Agent, or Firm* — Nicholas Chen; David Andrews; Micky Minhas

(57) ABSTRACT

Embodiments are directed to establishing registration objects for distributed processes, to managing memory on worker processes of a distributed software application and to using object serialization to communicate references to shim objects. In one scenario, a computer system accesses distributed process instances in a distributed runtime and creates a registration object for each of the process instances in the distributed runtime. The registration object includes a key value pair, where the key includes a unique identifier (ID) that identifies a distributed array instance associated with the distributed process, and the value includes a reference to a local portion of the distributed array instance. The computer system then maintains a mapping between the unique ID and the distributed array instance using the registration object. As such, the key value refers to the local portion of the same distributed array instance on each distributed process of the distributed runtime.

20 Claims, 5 Drawing Sheets

(56) References Cited

U.S. PATENT DOCUMENTS

| | | | |
|---|---|---|---|
| 2003/0115573 | A1 | 6/2003 | Syme et al. |
| 2003/0159130 | A1 | 8/2003 | Broussard et al. |
| 2005/0102353 | A1* | 5/2005 | Murphy et al. ............... 709/203 |
| 2005/0149903 | A1 | 7/2005 | Archambault et al. |
| 2005/0240621 | A1 | 10/2005 | Robertson et al. |
| 2007/0028210 | A1 | 2/2007 | Meijer et al. |
| 2008/0195646 | A1* | 8/2008 | Meijer et al. ................. 707/102 |
| 2008/0228853 | A1 | 9/2008 | Brinck et al. |
| 2008/0320453 | A1 | 12/2008 | Meijer et al. |
| 2009/0113216 | A1 | 4/2009 | Chen et al. |
| 2010/0162211 | A1 | 6/2010 | Ostrovsky et al. |
| 2010/0211753 | A1 | 8/2010 | Yionen |
| 2010/0235412 | A1* | 9/2010 | Kawachiya et al. .......... 707/813 |
| 2010/0299660 | A1 | 11/2010 | Torgersen et al. |
| 2011/0010715 | A1 | 1/2011 | Papakipos et al. |
| 2011/0022794 | A1 | 1/2011 | Jibbe et al. |
| 2011/0179402 | A1 | 7/2011 | Buckley et al. |
| 2011/0265067 | A1 | 10/2011 | Schulte et al. |
| 2011/0321010 | A1 | 12/2011 | Wang |
| 2012/0030672 | A1 | 2/2012 | Zygmuntowicz et al. |
| 2012/0185824 | A1 | 7/2012 | Sadler et al. |
| 2014/0006473 | A1 | 1/2014 | Raghunathan et al. |
| 2014/0007060 | A1 | 1/2014 | Warren et al. |
| 2014/0137087 | A1 | 5/2014 | Cimadamore et al. |
| 2014/0189662 | A1 | 7/2014 | Mameri et al. |

OTHER PUBLICATIONS

"Cutting Edge: Collections and Data Binding", Published on: May 2005, Available at: http://msdn.microsoft.com/en-us/magazine/cc163798.aspx.

Strahl, Rick, "Visual FoxPro Web Services Revisited", Published on: Oct. 3, 2007, Available at: http://www.code-magazine.com/articleprint.aspx?quickid=0703062&printmode=true.

"Serviceware Downloads", Retrieved on: Feb. 21, 2013, Available at: http://www.idesign.net/Downloads.

Meier, et al., "Improving .NET Application Performance and Scalability", Published on: May 2004, Available at: http://msdn.microsoft.com/en-in/library/ff647768.aspx.

Hassen, et al., "Hawk: A Runtime System for Partitioned Objects", In Proceedings of Parallel Algorithms and Applications, vol. 12, Issue 1-3, Aug. 1997, pp. 205-230.

Sinha, et al., "Adaptive Runtime Partitioning of AMR Applications on Heterogeneous Clusters", in Proceedings of the 3rd IEEE International Conference on CLuster Computing, Mar. 2001, pp. 435-442.

Hassen, Saniya Ben, "Prefetching Strategies for Partitioned Shared Objects", In Proceedings of the 29th Annual Hawaii International Conference on System Sciences, Jan. 3, 1996, pp. 261-270.

Cardelli, Luca, "Obliq A Language with Distributed Scope", Published on: Jun. 3, 1994, Available at: http:www.hpl.hp.com/techreports/Compaq-DEC/SRC-RR-122.pdf.

Arabe, et al., "Dome: Parallel Programming in a Distributed Computing Environment", In Proceedings of the 10th International Parallel Processing Symposium, Apr. 15, 1996, pp. 218-224.

Hoogerwerf, Ronnie, "The "Cloud Numerics" Programming and Runtime Execution Model", Published on: Jan. 11, 2012, Available at: http://blogs.msdn.com/b/cloudnumerics/archive/2012/01/11/the-cloud-numerics-programming-and-runtime-execution-model.aspx.

Chang, et al., "Evaluating the Performance Limitations of MPMD Communication", In Proceedings of the ACM/IEEE conference on Supercomputing (CDROM), Nov. 15, 1997, pp. 1-10.

Office Action dated Apr. 24, 2014 cited in U.S. Appl. No. 13/539,244.

Dragos, et al., "Compiling Generics Through User-Directed Type Specialization", 2009 ACM, ICOOOLPS'09, Jul. 6-10, 009, Genova, Italy, pp. 1-6.

Allen, et al., "Type Checking Modular Multiple Dispatch with Parametric Polymorphism and Multiple Inheritance", 2011 ACM, OOPSLA 11, Oct. 22-27, 2011, Portland, Oregon, USA, pp. 1-20.

Vangas, et al., "Strongly Typed Metadata Access in Object Oriented Programming Languages with Reflection Support", Baltic J. Modern Computing, vol. 1 (2013), Jul. 30, 2013, No. 1, 77-10, 77-100.

Milewicz, et al., "SimpleConcepts: Support for Constraints on Generic Types in C++", Sep. 8-11, 2013 IEEE, pp. 1535-1540.

Notice of Allowance dated Sep. 2, 2014 cited in U.S. Appl. No. 13/539,244.

* cited by examiner

PROVIDING DISTRIBUTED ARRAY CONTAINERS FOR PROGRAMMING OBJECTS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Software applications may be configured for use on a single, local computer system, or they may be configured for distribution over multiple different computer systems. Such applications are referred to as "distributed applications". These applications may be divided into different portions, and each portion may be executed in parallel with the other portions. Similarly, applications may be configured to process local data arrays or distributed data arrays. Distributed data arrays may be stored on and/or processed over multiple different databases. Performing operations that are consistently applied across the distributed data arrays, however, may be problematic.

BRIEF SUMMARY

Embodiments described herein are directed to establishing registration objects for distributed processes, to managing memory on worker processes of a distributed software application and to using object serialization to communicate references to shim objects. In one embodiment, a computer system accesses distributed process instances in a distributed runtime and creates a registration object for each of the process instances in the distributed runtime. The registration object includes a key value pair, where the key includes a unique identifier (ID) that identifies a distributed array instance associated with the distributed process, and the value includes a reference to a local portion of the distributed array instance. The computer system then maintains a mapping between the unique ID and the distributed array instance using the registration object. As such, the key value refers to the local portion of the same distributed array instance on each distributed process of the distributed runtime.

In another embodiment, a computer system determines that a distributed software function has finished processing one of its operations. The distributed software function includes one or more shim objects that are instantiated on a master rank and various worker ranks of the distributed application. The shim objects are configured to store a reference to a local object instance of the distributed array object, where the reference includes a unique identifier for the distributed array object. The computer system then determines that the distributed software application has finished processing and allows the shim objects instantiated on the worker ranks to go out of scope. The distributed object reference is retained to prevent garbage collection from recovering local data storage associated with the distributed software function.

In still another embodiment, a computer system instantiates shim objects on various ranks of a distributed application. As with the embodiment above, the shim objects are configured to store a registration object in a distributed object cache for each rank. The registration object includes a unique identifier for the distributed array object instance and a reference to a local portion of the distributed array instance. The shim is instantiated in response to receiving an indication that a distributed function has been invoked on a master process of a distributed software application. The computer system serializes the shim objects for communication of the stored references from the master rank of the distributed application to the worker ranks of the distributed application. Then, upon serializing the shim objects, the shim object's stored references are communicated from the distributed object cache for that rank to the worker ranks of the distributed application. The computer system then determines that a distributed array destructor has been invoked on the master process and removes the shim objects from the distributed object cache on each process of the distributed application, so that references to the underlying distributed array object are removed, and memory previously allocated to the unique identifier is recoverable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
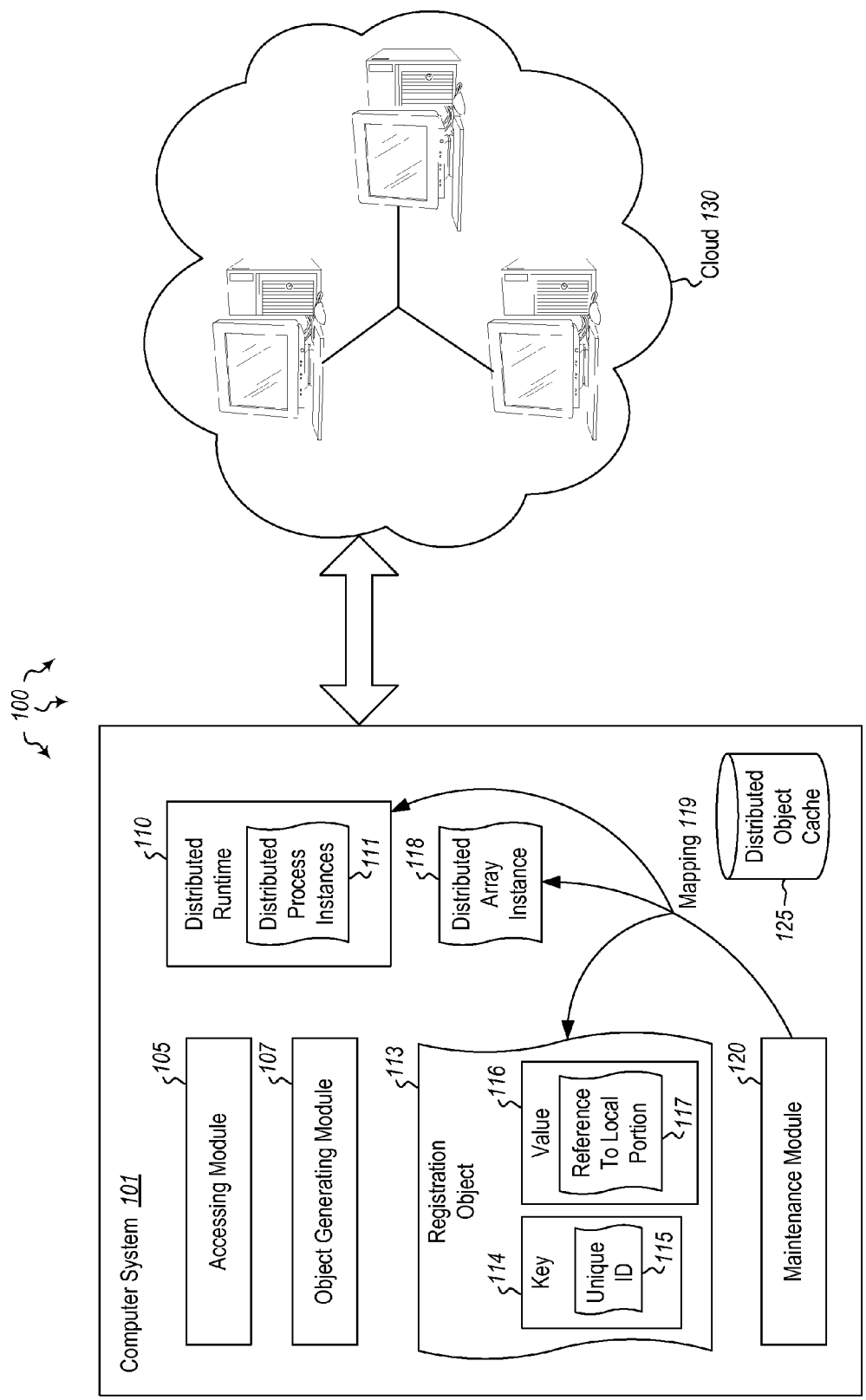
FIG. 1 illustrates a computer architecture in which embodiments described herein may operate including establishing registration objects for distributed processes.

Embodiments described herein are directed to establishing registration objects for distributed processes, to managing memory on worker processes of a distributed software application and to using object serialization to communicate references to shim objects. In one embodiment, a computer system accesses distributed process instances in a distributed runtime and creates a registration object for each of the process instances in the distributed runtime. The registration object includes a key value pair, where the key includes a unique identifier (ID) that identifies a distributed array instance associated with the distributed process, and the value includes a reference to a local portion of the distributed array instance. The computer system then maintains a mapping between the unique ID and the distributed array instance using the registration object. As such, the key value refers to the local portion of the same distributed array instance on each distributed process of the distributed runtime.

In another embodiment, a computer system determines that a distributed software function has finished processing one of its operations. The distributed software function includes one or more shim objects that are instantiated on a master rank and various worker ranks of the distributed application. The shim objects are configured to store a reference to a local object instance of the distributed array object, where the reference includes a unique identifier for the distributed array object. The computer system then determines that the distributed software application has finished processing and allows the shim objects instantiated on the worker ranks to go out of scope. The distributed object reference is retained to prevent garbage collection from recovering local data storage associated with the distributed software function.

In still another embodiment, a computer system instantiates shim objects on various ranks of a distributed application. As with the embodiment above, the shim objects are configured to store a registration object in a distributed object cache for each rank. The registration object includes a unique identifier for the distributed array object instance and a reference to a local portion of the distributed array instance. The shim is instantiated in response to receiving an indication that a distributed function has been invoked on a master process of a distributed software application. The computer system serializes the shim objects for communication of the stored references from the master rank of the distributed application to the worker ranks of the distributed application. Then, upon serializing the shim objects, the shim object's stored references are communicated from the distributed object cache for that rank to the worker ranks of the distributed application. The computer system then determines that a distributed array destructor has been invoked on the master process and removes the shim objects from the distributed object cache on each process of the distributed application, so that references to the underlying distributed array object are removed, and memory previously allocated to the unique identifier is recoverable.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which the principles of the present invention may be employed. Computer architecture 100 includes computer system 101. Computer system 101 may be any type of local or distributed computer system, including a cloud computing system. The computer system includes various different modules for performing a variety of different functions. For instance, the computer system includes accessing module 105. The accessing module 105 may be configured to access distributed process instances that are running within distributed runtime 110. The distributed process instances may be instances of any type of distributed process, function, application or other portion of software code. The distributed runtime may allow substantially any number distributed processes to be running on substantially any number of computer systems (e.g. within cloud 130).

Computer system 101 also includes an object generating module 107. This module may be configured to generate registration objects such as 113. The registration objects may include key value pairs with key 114 and value 116. The key may include a unique identifier 115 for a specific distributed array instance (also referred to as a distributed array object herein). For instance, unique ID 115 may be a unique identifier for distributed array instance 118. The value 116 of the key value pair may include a reference to a local portion 117 of the distributed array instance. In this manner, the ID 115 may globally identify the distributed array instance among a plurality of different distributed array instances, and the reference 117 may point to where the data for the array instance is actually stored (i.e. the physical machine or data store). The maintenance module 120 may then maintain a mapping between the registration object and the distributed array instance for each process instance.

Figure 5:
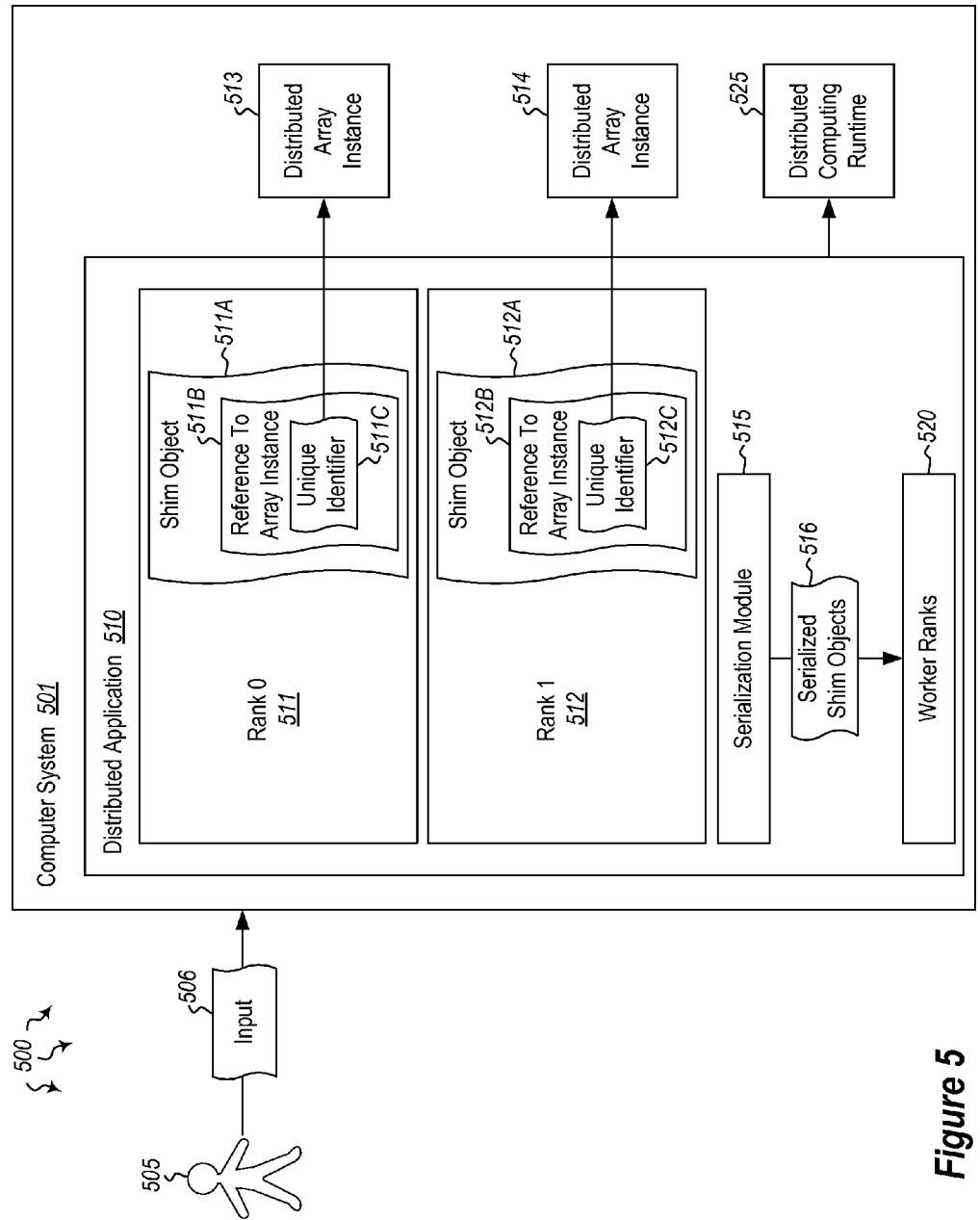
FIG. 5 illustrates an embodiment in which memory is managed on worker processes of a distributed software application.

FIG. 5 illustrates a computer system 501 that may be similar to or the same as computer system 101. Computer system 501 includes a serialization module 515. The serialization module may be configured to serialize shim objects (e.g. 511A and 512A). The shim objects may be instantiated on various ranks of a distributed application. For example, distributed application 510 may have rank 0 (511) and rank 1 (512), as well as worker ranks 520 (rank 1 may be part of the worker ranks, while rank 0 may be referred to as a master rank). The shim objects are configured to store a reference (e.g. reference 511B) to an instance of a distributed array (e.g. 513). The reference includes a unique identifier (e.g. 511C) for the native partitioned array instance 513.

In addition to serialization, various embodiments that perform memory management of distributed array data structures are provided. These serialization and memory management functions may be exposed to end-users (such as user 505) of a distributed-computing runtime 525. From the user's perspective, the distributed application 510 may have a single logical thread of execution that performs aggregate operations on local and distributed objects. However, aggregate operations on distributed arrays, in turn, may use a command-dispatch mechanism in the distributed runtime 525 to operate on the arrays (e.g. 513 and 514) in parallel. Embodiments described herein cover the translation of operations on the shim objects to operations on the underlying partitioned arrays in conjunction with the distributed runtime 125.

Embodiments herein may implement serialization and object-disposal mechanisms that, at least in some cases, are already built into a client-side development environment to keep the amount of client-specific serialization and object-disposal logic in the language-independent runtime to a minimum. This allows the runtime to be targeted to a number of client programming languages, as long as those languages support basic operations such as user-overridable serialization and some means to run finalizers (deterministically or otherwise). In addition to distributed function execution mechanisms, embodiments described herein include an object model in the native runtime system that exposes a set of local and distributed array types.

Each distributed array instance (e.g. 513 or 514) consists of metadata that describes the global dimensions of the array as well what part of the global array the distributed array owns. Moreover, each distributed array instance is associated with a unique identifier 511C. Each unique identifier is associated with one distributed array instance. The unique identifier for a distributed array may be applied at the time of the array's creation and, at least in some embodiment, does not change during the array's lifetime. On each process in the distributed runtime 125, a particular identifier refers to the same instance of the distributed array (e.g. unique identifier 112C refers to array instance 114). To guarantee this property, distributed arrays are created in a collective manner on all processes in the runtime, but can be destroyed at different points in time (i.e., at least in some embodiments, creation requires synchronization but destruction does not).

A singleton registry object on each process in the runtime contains the mapping between an identifier and a distributed array. Each registration object (e.g. 113) is a managed programming container (e.g. a .NET container) that includes references to the local instance of the referenced global array (e.g. reference 117). In some embodiments, the lifetime of local and/or distributed objects in the distributed runtime is managed using reference counting principles. When a new distributed array instance is first created in the distributed runtime, its reference count is set to one. When an instance of a distributed partitioned array on a given process is assigned to a new reference, its reference count is incremented. Similarly, when a reference to an array instance is no longer required, its reference count is decremented. When the reference count for any array instance goes to zero, the array instance is destroyed or de-allocated, and any memory and resources allocated during its construction are reclaimed in a garbage collection process.

A shim object or "shim array" may be instantiated in two different ways. First, when a new native distributed array is created (e.g. array 513), a shim array (511A) is also constructed on the master process (e.g. rank 0 (511)). Then, when a distributed function is invoked on the master process and one of its input arguments happens to be a shim array, the runtime on the master process serializes the shim array and communicates it to all the worker processes 120. On the worker processes, the runtime in turn deserializes the arguments from the master process and reconstitutes one or more shim arrays. Irrespective of how a shim array is created, there are two references to the underlying native partitioned array on each process (the first reference is held by the runtime itself and the second is held by the shim object).

Shim arrays support the default serialization interfaces in the client programming environment. For example, in the .NET programming language, the "ISerializable" interface is implemented, and in the Java programming language, the "Serializable" interface is implemented. When a shim array is serialized on the master process (e.g. 511), the only information that is written is the unique global identifier (511C). When this is deserialized on a non-master (i.e. worker) process, the default serialization framework may call a special deserialization constructor for the shim object. This constructor may perform two operations: first, it obtains the unique identifier and, second, looks up the reference to the distributed array on that rank through the distributed object registry.

When a collective function completes, the shim objects on all but the master process go out of scope and are marked for garbage collection (in the case of garbage-collected programming environments such as .NET and Java), or are deterministically finalized in programming environments such as C++ and Python. When a shim object is finalized (irrespective of whether it is created on the master or non-master (worker) processes), the reference count of the underlying native distributed array object is decremented. After this operation in all but the master process, the reference count of the native object is one (and therefore, the object is still not disposed of entirely).

Once a distributed application invocation is complete, the distributed native array object on the master process still has a reference count of two. At some point in the user application, the shim object (511A) on the master (511) is either marked for garbage collection or is immediately disposed of. At that point, a finalizing method in the shim object executes two steps: 1) the first step decrements the reference count of the native object and 2) the second step adds the unique identifier (511C) to the native partitioned array object (513) to a "garbage-collection queue" consisting of global identifiers of the native partitioned array instances to be finalized across all processes. At specified points in time (such as before executing a distributed function), the master process may broadcast the queue of handles to all processes. Then, each process (including the master) performs a garbage collection step where it again decrements the reference count of the native object. At this point, the reference count of the native object goes to zero and the native object is de-allocated, freeing up any memory allocated in the native heap.

From a user perspective (e.g. from user 505's perspective), a distributed object array allows the user to treat multiple items contained within the array as a single collection of objects even though the storage for these objects may be distinct and span the memories of multiple computers. The design of the distributed arrays described herein includes both a collection of distributed (programming) object arrays which are a thin shim data structure that extend conventional array containers with additional metadata useful for distributed array processing, and the distributed container itself which manages distributed array allocations, garbage collection, and which implements the fundamental array operations such as indexed reading and writing.

As mentioned above, a distributed object array may be instantiated in two different ways. First, at creation time a shim registration object 113 containing the unique global ID 115 along with metadata describing the global shape, distribution information, and a local object array reference is constructed on each process 111 and recorded in the distributed object cache 125. Then, when a distributed function is invoked on the master process and one of its input arguments is a distributed object array shim, the runtime on the master process serializes the shim array and communicates it to all the worker processes. On the worker processes, the runtime in turn deserializes the arguments from the master process and reconstitutes one or more shim arrays from its distributed array cache 125. Irrespective of how a shim array is created, there are two references to the underlying object on each process while parallel operations are executing (the first reference is held by the runtime itself as it executes the specified method using the specified input arguments and the second is held by the distributed object cache).

Once a distributed function invocation is complete, the distributed array object on the master process retains its reference count of two. On worker processes however, the compute completes and the distributed object that was an input argument to the distributed function, will normally go out-of-scope, thus decrementing its local reference count by one. The distributed object cache reference is retained however and thus prevents programming-language-implemented garbage collection from recovering local data storage associated with the distributed object computation that just completed.

Thus, either by user programmed actions or by programming language scoping rules, a distributed object array destructor is invoked on the master process. This action causes a new collective operation to take place which subsequently removes the specified distributed object shim from the distributed object cache on each process. The result of deleting the cache object entry on each rank is that upon completion of this operation, there are no remaining references to the underlying distributed array object and the system is thus free to recover all memory previously allocated to the specified global ID (e.g. ID 115).

Accordingly, embodiments described herein support a variety of different client programming environments. Moreover, embodiments described herein do not require large amounts of client-specific code as other solutions have, particularly around command execution and object lifetime management. The principals and functionality described above will be described in greater detail below with regard to Figures methods 200, 300 and 400 of FIGS. 2, 3 and 4, as well as the embodiments described in FIG. 5.

Figure 2:
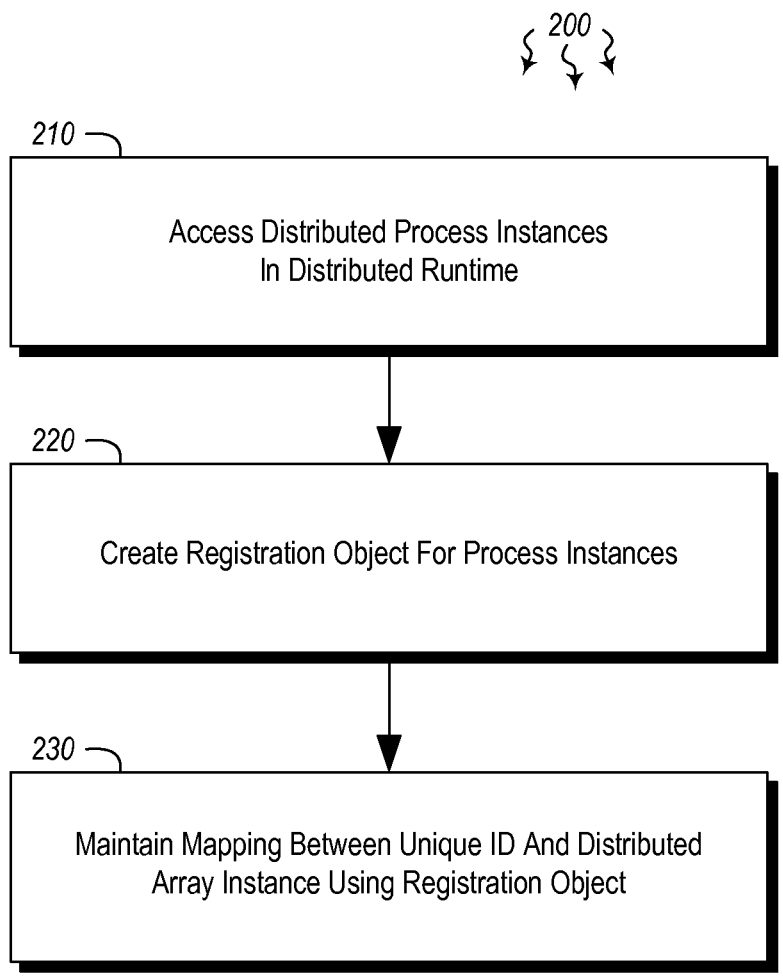
FIG. 2 illustrates a flowchart of an example method for establishing registration objects for distributed processes.
Figure 3:
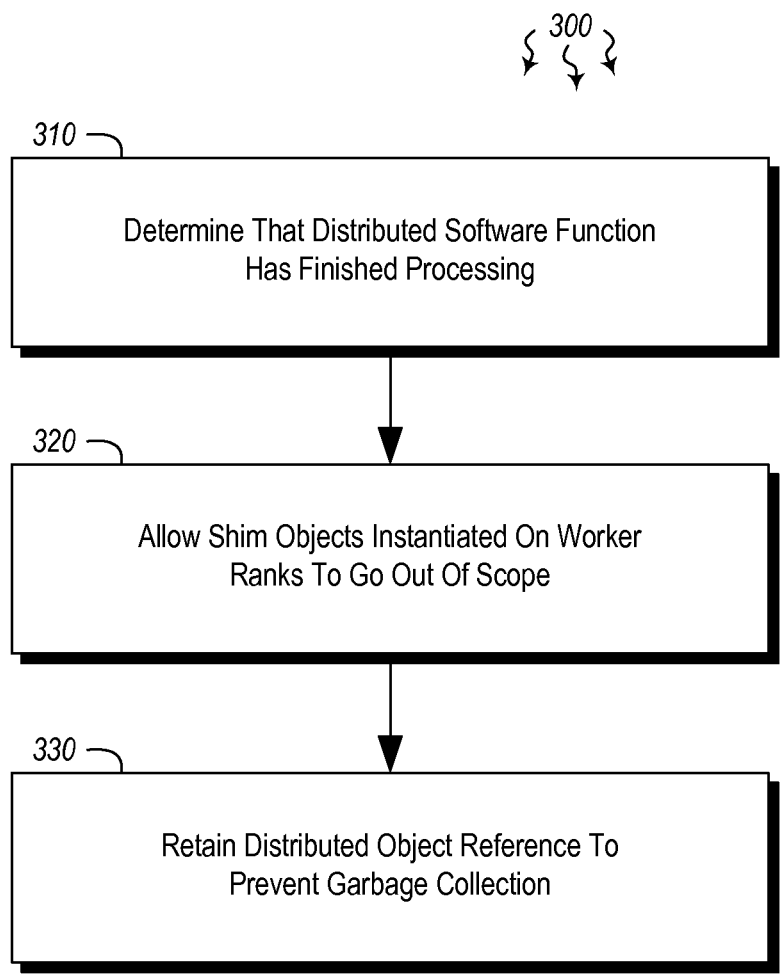
FIG. 3 illustrates a flowchart of an example method for managing memory on worker processes of a distributed software application.
Figure 4:
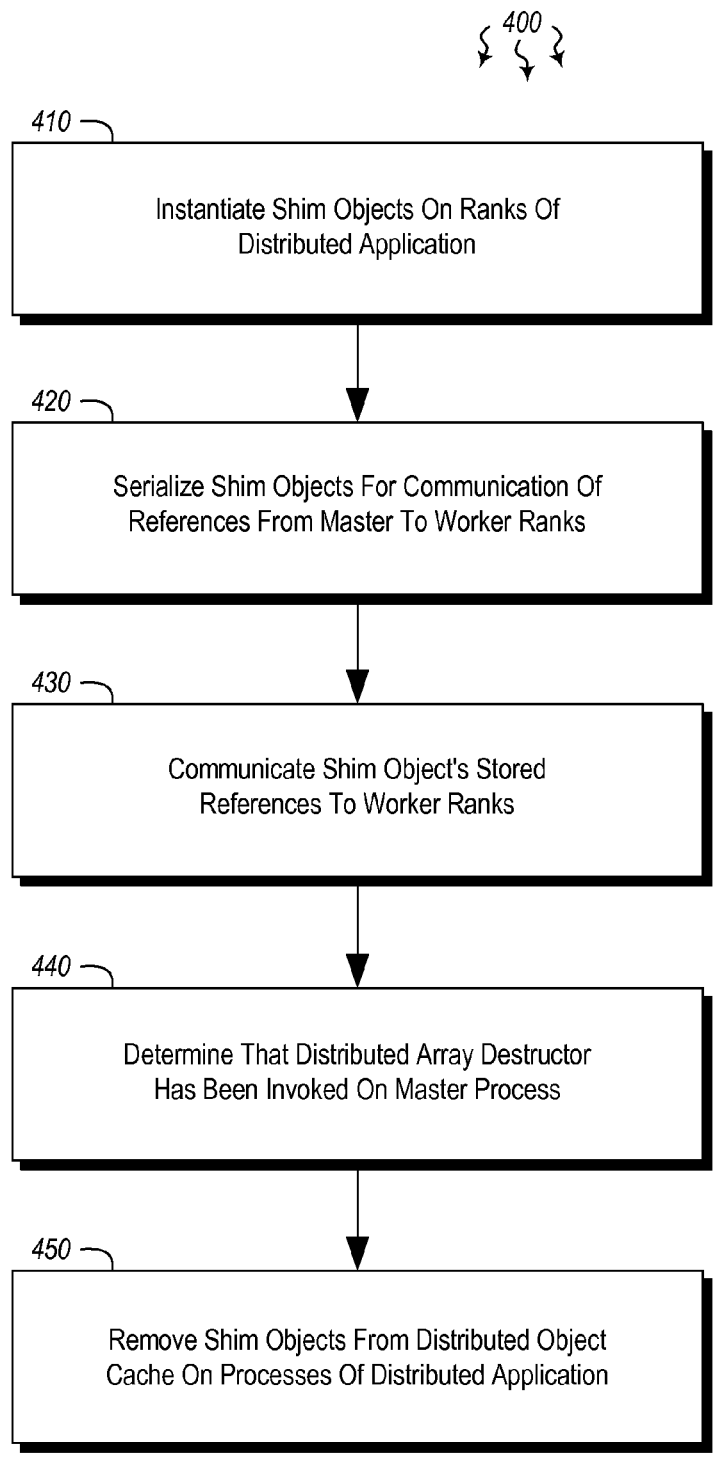
FIG. 4 illustrates a flowchart of an example method for using object serialization to communicate references to shim objects

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for establishing registration objects for distributed processes. The method 200 will now be described with frequent reference to the components and data of environment 100 of FIG. 1.

Method 200 includes an act of accessing one or more distributed process instances in a distributed runtime (act 210). For example, accessing module 105 may access distributed process instance 111 that is running within distributed runtime 110. The distributed array instance may include multiple different programming objects, of different or the same types. It should also be noted that the distributed array instance may include programming objects and/or numerical values. Accordingly, either type of programming or numerical objects may be included in and referenced by distributed array instance 118. As will be explained below, the maintenance module 120 may maintain a mapping between items. The mapping between the unique ID 115 and the distributed array instance 118 may be maintained using the registration object 113 for both numeric and non-numeric distributed arrays. It should be further noted that the distributed array instance may itself be a programming object.

Method 200 includes an act of creating a registration object for the one or more process instances in the distributed runtime, the registration object including a key value pair, the key of the key value pair comprising a unique identifier (ID) that uniquely identifies a distributed array instance associated with the distributed process, and the value of the key value pair comprising a reference to a local portion of the distributed array instance (act 220). For example, object generating module 107 may create registration object 113 for each of the one or more distributed runtime processes 111.

As mentioned above, the registration object may include a key value pair with key 114 and value 116. The key 114 stores a unique, global identifier 115 for the distributed array instance, and the value 116 stores a reference to the local portion 117 of the distributed array instance. The unique identifier may be fixed for each distributed array instance (e.g. 118) at the time the distributed array instance is created, and (at least in some cases) does not change during the distributed array instance's lifetime. The distributed arrays are created synchronously for each distributed process of the distributed runtime. This is done to ensure that a particular identifier refers to the same instance of the distributed array. The distributed array instances may be destroyed either synchronously or asynchronously.

Method 200 includes an act of maintaining a mapping between the unique ID and the distributed array instance using the registration object, such that the key value refers to the local portion of the same distributed array instance on each distributed process of the distributed runtime (act 230). Maintenance module 120 maintains the mapping 119 between the unique ID 115 and the distributed array instance 118 using the registration object 113. The ID is globally unique, and may be used by a user to refer to an array of objects or distributed array instances. The key value 116 indicates where the corresponding local data is actually stored using the reference 117. The registration object 113 is maintained for each distributed process 111 in the distributed runtime 110. A user can thus refer to one distributed object, and it will have the same unique ID in each registration object.

As will be explained further below, the registration object 113 may be used to reference a distributed array instance in order to perform a distributed array operation. The distributed array operation may include memory management, low-level structured communication operations, high-level unstructured communication operations such as global indexing, and other operations.

FIG. 3 illustrates a flowchart of a method 300 for managing memory on worker processes of a distributed software application. The method 300 will now be described with frequent reference to the components and data of environment 500 of FIG. 5.

Method 300 includes an act of determining that a distributed software function has finished processing, the distributed software function including one or more shim objects instantiated on a master rank and one or more worker ranks of the distributed application, the shim objects being configured to store a reference to a local object instance of the distributed array object, the reference including a unique identifier for the distributed array object (act 310). Computer system 501 may, for example, determine that distributed application 510 has finished processing. The distributed application 510 may include shim objects for each rank, including shim object 511A for rank 0 (511), and shim object 112A for rank 1 (512). The shim objects include a reference 511B/512B to the local portion of a distributed array instance 513/514, and includes a unique, global identifier 511C/512C to the distributed array instance 513/514.

The shim objects further include various portions of metadata. The metadata may describe multiple different aspects of the distributed array instance, including global shape of the distributed array instance, and distribution information for the distributed array instance 513/514. The shim objects allow communication among one or more ranks of the distributed software function. For example, the unique ID 511C/512C may be used to serialize a distributed array object, convert the distributed array object back into a key, transmit the key, then look up the key on deserialization and reconstitute the local portion of the distributed array object on each process. It should also be noted that the shim objects may be implemented in a thin-client-dependent environment, where the client is used for interaction with the distributed array instances. In some cases, the shim objects comprise classes, allowing programmers or other users to specify which serializers and deserializers are to be used in communication.

Method 300 next allows the shim objects instantiated on the worker ranks 520 to go out of scope (act 320), and retains the distributed object reference to prevent garbage collection from recovering local data storage associated with the distributed software function (act 330). As such, automatic garbage collection can be avoided for the objects referenced by the local portion reference 117 of the key value pair. These references may further be updated if it is determined that the reference's corresponding local data location has changed due to garbage collection. In this manner, the lifetime of each distributed array object is managed from creation to destruction.

FIG. 4 illustrates a flowchart of a method 400 for using object serialization to communicate references to shim objects. The method 400 will now be described with frequent reference to the components and data of environment 500 of FIG. 5.

Method 400 includes an act of instantiating shim objects on one or more ranks of a distributed application, the shim objects being configured to store a registration object in a distributed object cache for each rank, the registration object including a unique identifier for the distributed array object instance and a reference to a local portion of the distributed array instance, the shim being instantiated in response to receiving an indication that a distributed function has been invoked on a master process of a distributed software application (act 410). The shim objects may then be serialized for communication of the stored references from the master rank of the distributed application to one or more worker ranks 520 of the distributed application 510 (act 420).

After the shim objects 511A/512A have been serialized, the shim object's stored references are communicated from the distributed object cache 125 for that rank to the one or more worker ranks of the distributed application (act 430). The computer system 501 then determines that a distributed array destructor has been invoked on the master process (act 440) and removes the shim objects from the distributed object cache on each process of the distributed application 510. As such, references to the underlying distributed array object are removed, and memory previously allocated to the unique identifier is recoverable (act 450). In this manner, object serialization is used to communicate references to shim objects. As with at least some of the embodiments described above, distributed array operations may be performed using object serialization for communication. The operations on the distributed array objects may be sent to the unique identifier in the stored reference of the shim object to be performed.

Accordingly, methods, systems and computer program products are provided which establish registration objects for distributed processes. Moreover, methods, systems and computer program products are provided which manage memory on worker processes of a distributed software application and use object serialization to communicate references to shim objects.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more hardware processors;
system memory; and
one or more hardware storage devices having stored thereon computer-executable instructions that, when executed by the one or more hardware processors, causes the computing system to establish registration objects for distributed processes, including the following:
identifying a plurality of distributed process instances executing across a plurality of computer systems in a distributed runtime, each of the plurality of distributed process instances comprising a different instance of a particular portion of a distributed application that is being executed over the plurality of computer systems using the distributed runtime;
creating a registration object for the plurality of distributed process instances in the distributed runtime, the registration object enabling each of the plurality of distributed process instances to operate on a distributed array that includes data that is stored among the plurality of computer systems, the registration object including:
a unique identifier (ID) that uniquely and globally identifies, to the plurality of distributed process instances, a particular distributed array instance of a plurality of different distributed array instances within the distributed runtime, and
a reference to a local portion of the distributed array instance, which identifies a particular computer system, among the plurality of computer systems, on which a portion of data for the distributed array instance is actually stored; and
maintaining a mapping between the unique ID and the distributed array instance using the registration object, such that the reference refers to the local portion of the same distributed array instance on each distributed process instance of the distributed runtime.

2. The computer system of claim 1, wherein the distributed array instance includes a plurality of programming objects.

3. The computer system of claim 1, wherein the distributed array instance includes at least one programming object and at least one numerical value.

4. The computer system of claim 3, wherein the mapping between the unique ID and the distributed array instance is maintained using the registration object for both numeric and non-numeric distributed arrays.

5. The computer system of claim 1, wherein the distributed array instance is itself a programming object.

6. The computer system of claim 1, wherein the registration object is maintained for each distributed process in the distributed runtime.

7. The computer system of claim 1, wherein the unique identifier is fixed for each distributed array instance at the time the distributed array instance is created, and does not change during the distributed array instance's lifetime.

8. The computer system of claim 1, wherein distributed arrays are created synchronously for each distributed process of the distributed runtime.

9. The computer system of claim 8, wherein the distributed arrays are destroyed asynchronously.

10. The computer system of claim 1, further comprising performing at least one distributed array operation.

11. The computer system of claim 10, wherein the distributed array operation comprises memory management.

12. The computer system of claim 10, wherein the distributed array operation comprises global indexing.

13. A method, implemented at a computer system that includes one or more processors, for establishing registration objects for distributed processes, the method comprising:
 identifying a plurality of distributed process instances executing across a plurality of computer systems in a distributed runtime, each of the plurality of distributed process instances comprising a different instance of a particular portion of a distributed application that is being executed over the plurality of computer systems using the distributed runtime;
 creating a registration object for the plurality of distributed process instances in the distributed runtime, the registration object enabling each of the plurality of distributed process instances to operate on a distributed array that includes data that is stored among the plurality of computer systems, the registration object including:
  a unique identifier (ID) that uniquely and globally identifies, to the plurality of distributed process instances, a particular distributed array instance of a plurality of different distributed array instances within the distributed runtime, and
  a reference to a local portion of the distributed array instance, which identifies a particular computer system, among the plurality of computer systems, on which a portion of data for the distributed array instance is actually stored; and
 maintaining a mapping between the unique ID and the distributed array instance using the registration object, such that the reference refers to the local portion of the same distributed array instance on each distributed process instance of the distributed runtime.

14. The method of claim 13, wherein the unique identifier is fixed for each distributed array instance at the time the distributed array instance is created, and does not change during the distributed array instance's lifetime.

15. The method of claim 13, wherein creating a registration object comprises constructing a shim object on a master process, the shim object including: (i) the unique ID of the distributed array instance, and (ii) metadata describing a global shape of the distributed array instance, distribution information, and a local object array reference.

16. The method of claim 15, further comprising, when a distributed function is invoked on the master process, serializing the shim object and communicating the serialized shim object to one or more worker processes where the shim object is deserialized and reconstituted.

17. A computer program product comprising one or more hardware storage devices having stored thereon computer-executable instructions that, when executed on one or more processors of a computer system, cause the computer system to establish registration objects for distributed processes, including the following:
 identifying a plurality of distributed process instances executing across a plurality of computer systems in a distributed runtime, each of the plurality of distributed process instances comprising a different instance of a particular portion of a distributed application that is being executed over the plurality of computer systems using the distributed runtime;
 creating a registration object for the plurality of distributed process instances in the distributed runtime, the registration object enabling each of the plurality of distributed process instances to operate on a distributed array that includes data that is stored among the plurality of computer systems, the registration object including:
  a unique identifier (ID) that uniquely and globally identifies, to the plurality of distributed process instances, a particular distributed array instance of a plurality of different distributed array instances within the distributed runtime, and
  a reference to a local portion of the distributed array instance, which identifies a particular computer system, among the plurality of computer systems, on which a portion of data for the distributed array instance is actually stored; and
 maintaining a mapping between the unique ID and the distributed array instance using the registration object, such that the reference refers to the local portion of the same distributed array instance on each distributed process instance of the distributed runtime.

18. The computer program product of claim 17, wherein the unique identifier is fixed for each distributed array instance at the time the distributed array instance is created, and does not change during the distributed array instance's lifetime.

19. The computer program product of claim 17, wherein creating a registration object comprises constructing a shim object on a master process, the shim object including: (i) the unique ID of the distributed array instance, and (ii) metadata describing a global shape of the distributed array instance, distribution information, and a local object array reference.

20. The computer program product of claim 19, further comprising, when a distributed function is invoked on the master process, serializing the shim object and communicating the serialized shim object to one or more worker processes where the shim object is deserialized and reconstituted.

* * * * *